(12) United States Patent
Toyota (10) Patent No.: US 9,091,909 B2
(45) Date of Patent: Jul. 28, 2015

(54) PROJECTION TYPE DISPLAY APPARATUS (71) Applicant: Panasonic Corporation, Kadoma-shi, Osaka (JP)

(72) Inventor: Kazuhisa Toyota, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 141 days.

(21) Appl. No.: 13/898,489

(22) Filed: May 21, 2013

(65) Prior Publication Data

US 2013/0314674 A1 Nov. 28, 2013

(30) Foreign Application Priority Data

May 22, 2012 (JP) ................................. 2012-116197
Apr. 10, 2013 (JP) ................................. 2013-081829

(51) Int. Cl.
*G03B 21/16* (2006.01)
*H04N 9/31* (2006.01)
*G03B 21/20* (2006.01)

(52) U.S. Cl.
CPC ............ *G03B 21/16* (2013.01); *G03B 21/2053* (2013.01); *H04N 9/3144* (2013.01); *G03B 21/206* (2013.01)

(58) Field of Classification Search
CPC ... G03B 21/16; G03B 21/206; G03B 21/2013
USPC .................. 353/31, 52, 57, 58; 362/373, 294; 349/5, 7–9
See application file for complete search history.

(56) References Cited

U.S. PATENT DOCUMENTS

| 7,052,143 | B2 | 5/2006 | Russell et al. |
| 7,824,038 | B2 | 11/2010 | Yun et al. |
| 8,142,028 | B2 | 3/2012 | Nakajima |
| 8,237,652 | B2 * | 8/2012 | Kim .............................. 345/102 |
| 2006/0227561 | A1 * | 10/2006 | Childers et al. ............... 362/373 |
| 2007/0052930 | A1 * | 3/2007 | Ki ................................... 353/57 |
| 2007/0229774 | A1 * | 10/2007 | Hosokawa ..................... 353/53 |
| 2009/0040469 | A1 * | 2/2009 | Takeda ............................ 353/57 |
| 2012/0154763 | A1 * | 6/2012 | Noda et al. ..................... 353/58 |
| 2014/0333904 | A1 * | 11/2014 | Saito .............................. 353/58 |

FOREIGN PATENT DOCUMENTS

| JP | 2007-093880 A | 4/2007 |
| JP | 2010-164679 A | 7/2010 |

* cited by examiner

*Primary Examiner* — Sultan Chowdhury
(74) *Attorney, Agent, or Firm* — James W. Judge (57) ABSTRACT

A projection type display apparatus (50) includes: a plurality of light sources (100*a*) and (100*b*); a light source control section (101) configured to control each of the plurality of light sources (100*a*) and (100*b*); a plurality of fans (102*a*) and (102*b*), provided to correspond to the plurality of light sources (100*a*) and (100*b*), respectively, for cooling the corresponding light sources; and a fan diagnosis section (104) configured to diagnose a state of each of the plurality of fans (102*a*) and (102*b*). When a malfunction of one of the plurality of fans (102*a*) and (102*b*) is detected by the fan diagnosis section (104) while the plurality of light sources (100*a*) and (100*b*) are lit up, the light source control section (101) turns off one of the light sources corresponding to the one fan and continues to light up the remainder of the light sources.

16 Claims, 6 Drawing Sheets

PROJECTION TYPE DISPLAY APPARATUS

BACKGROUND

1. Field

The present disclosure relates to a projection type display apparatus that cools light sources by using fans.

2. Description of the Related Art

In recent years, projection type display apparatuses such as projectors have been used in various environments from homes to businesses. When a projection type display apparatus projects video, a light source lamp generates a large amount of heat. Thus, it is necessary to use a cooling fan that provides a strong cooling effect.

In addition, many projectors for large-scale facilities such as arenas, for digital cinemas, or for outdoor events and/or the like are equipped with a plurality of lamps in order to ensure high brightness and therefore a large amount of heat is generated from the lamps. Thus, in order to appropriately cool the lamps, a fan is provided for each lamp to cool the lamp.

However, when a fan is broken down and sufficient cooling performance cannot be maintained, the temperature of the projector set is increased, and problems such as housing damage may arise due to lamp heat.

SUMMARY

A projection type display apparatus according to the present disclosure includes: a plurality of light sources; a light source control section configured to control each of the plurality of light sources; a plurality of fans, provided to correspond to the plurality of light sources, respectively, for cooling the corresponding light sources; and a fan diagnosis section configured to diagnose a state of each of the plurality of fans. When a malfunction in part of the plurality of fans is detected by the fan diagnosis section while the plurality of light sources are lit up, the light source control section turns off part of the light sources corresponding to the part of the plurality of fans and continues to light up the remainder of the light sources.

DETAILED DESCRIPTION

Hereinafter, embodiments will be described in detail with reference to the drawings as appropriate. However, there will be instances in which detailed description beyond what is necessary is omitted. For example, detailed description of subject matter that is previously well-known, as well as redundant description of components that are substantially the same will in some cases be omitted. This is to prevent the following description from being unnecessarily lengthy, in order to facilitate understanding by a person of ordinary skill in the art.

The inventor provides the following description and the accompanying drawings in order to allow a person of ordinary skill in the art to sufficiently understand the present disclosure, and the description and the drawings are not intended to restrict the subject matter of the scope of the patent claims.

Hereinafter, an embodiment that is an example of the technology in the present disclosure will be described with reference to FIGS. 1 and 2.

Embodiment

Figure 1:
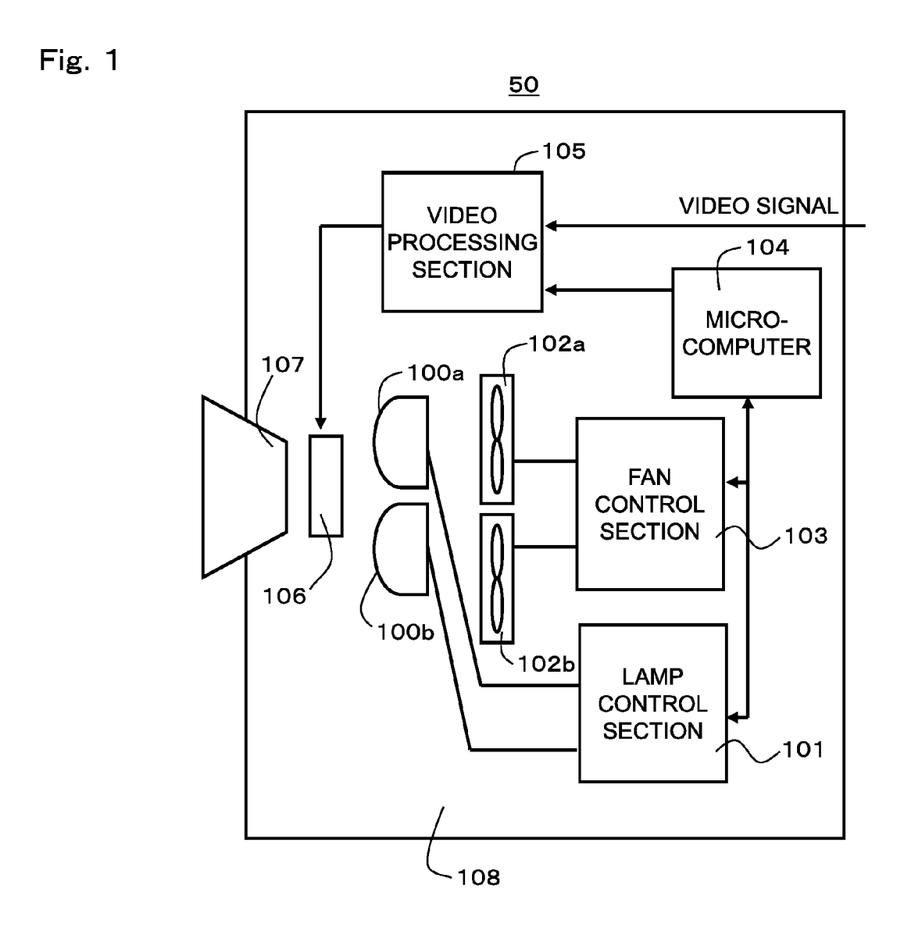
FIG. 1 is a schematic configuration diagram of a projector according to an embodiment.
Figure 2:
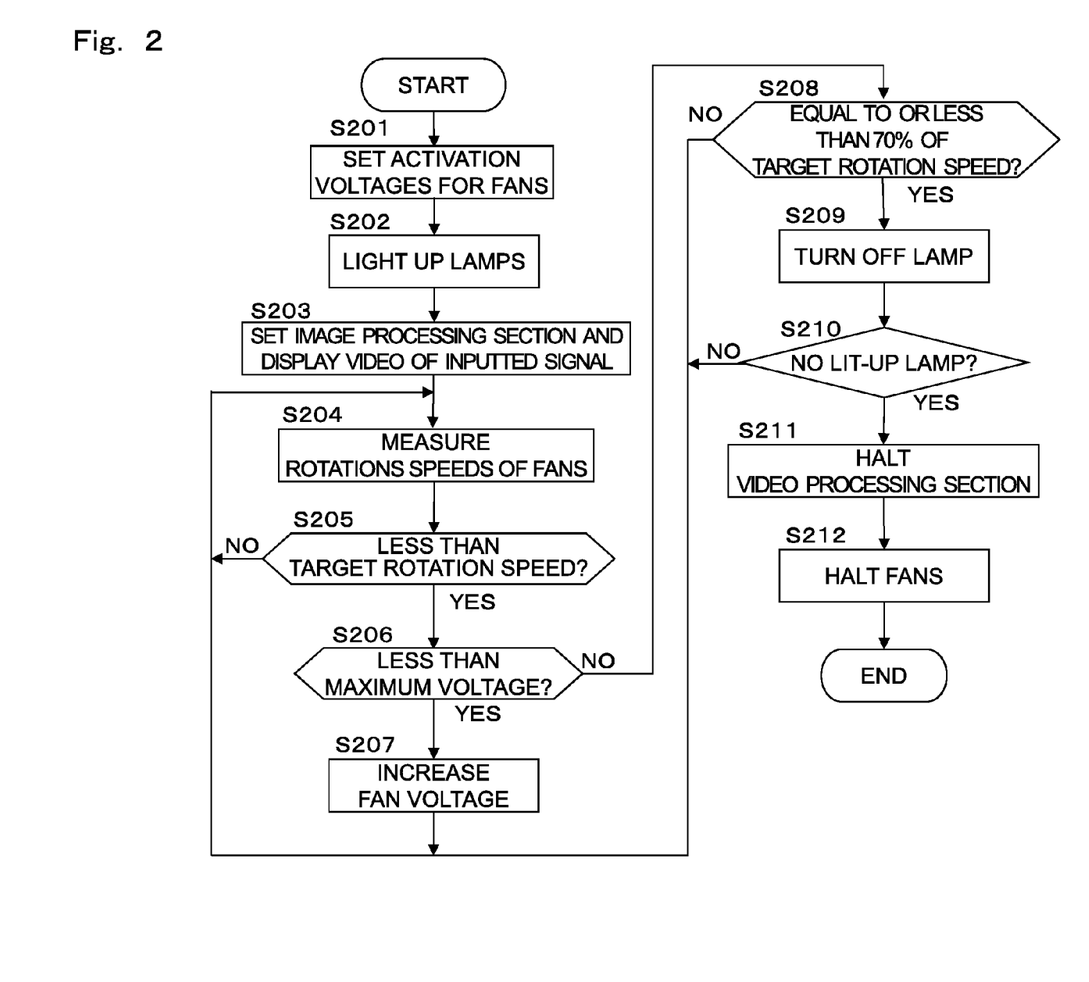
FIG. 2 is a flowchart showing an operation of the projector according to the embodiment.

FIG. 1 is a schematic configuration diagram of a projector 50 according to the present embodiment. The projector 50 is an example of a projection type display apparatus, and is a projector using a DMD (digital micromirror device).

[1. Schematic Configuration of Projector]

The projector 50 shown in FIG. 1 includes: a first lamp 100a and a second lamp 100b that are light sources; a lamp control section 101 that controls lighting-up/turning-off of the first lamp 100a and the second lamp 100b; a first fan 102a that cools the first lamp 100a; a second fan 102b that cools the second lamp 100b; and a fan control section 103 that controls the first fan 102a and the second fan 102b. The fans 102a and 102b are provided to correspond to the lamps 100a and 100b, respectively. The fan control section 103 controls a rotation speed of each of the first fan 102a and the second fan 102b and also detects the rotation speed of each of the first fan 102a and the second fan 102b. In addition, the projector 50 in FIG. 1 includes: a video processing section 105 that adjusts the quality of an image based on an inputted video signal (a signal outputted from a PC or a video recorder); a DMD (digital micromirror device) 106 that modulates and reflects light emitted from the first lamp 100a and the second lamp 100b, on the basis of an output signal from the video processing section 105; a lens 107 that projects video from the DMD 106 onto an external screen; a microcomputer 104 that controls each control block (the lamp control section 101, the fan control section 103 etc.); and a housing 108 that stores these components therein.

It should be noted that a light source used as each of the lamps 100a and 100b in the present embodiment is a high-pressure mercury lamp. In addition, each of the fans 102a and 102b is, for example, a DC fan.

As described later, on the basis of an output signal from the fan control section 103, the microcomputer 104 performs control of rotation of the first fan 102a and the second fan 102b and a process of detecting the rotation speeds of the first fan 102a and the second fan 102b. In addition, the microcomputer 104 diagnoses a state of each of the first fan 102a and the second fan 102b. The microcomputer 104 detects a malfunction in each of the fans 102a and 102b on the basis of the rotation speed of each of the fans 102a and 102b.

The video processing section 105 is composed of a plurality of circuits including: a video circuit that adjusts parameters of image quality such as contrast, brightness, and color temperature; and a format converter that converts a video signal to a signal corresponding to the number of display pixels of the DMD 106. The video processing section 105 is composed of an IC (integrated circuit).

The fan control section 103 includes: a D/A conversion section for controlling rotation of each of the first fan 102a and the second fan 102b; and a pulse counter section that measures the rotation speed of each of the first fan 102a and the second fan 102b. The D/A conversion section sets each of the first fan 102a and the second fan 102b as a target, converts a digital value set by the microcomputer 104 to a DC voltage value, and changes a DC voltage supplied to the target fan (the first fan 102a or the second fan 102b), thereby controlling the rotation speed of the target fan. In addition, the pulse counter section sets each of the first fan 102a and the second fan 102b as a target and counts a pulse signal outputted with rotation of the target fan, to measure the rotation speed of the target fan.

The microcomputer 104 includes: a CPU (central processing unit) that executes a program; a built-in memory that records therein the program, data for the program, and user setting values of the projector 50; and an interface section for controlling each circuit and/or the like.

[2. Operation of Projector]

Next, an operation of the projector 50 according to the present embodiment will be described with reference to a flowchart shown in FIG. 2.

When the projector 50 is turned on, the microcomputer 104 loads the program from the built-in memory and starts executing the program. By so doing, a process in the flowchart shown in FIG. 2 is started.

First, the microcomputer 104 sets an activation voltage for the first fan 102a and an activation voltage for the second fan 102b via the fan control section 103 and activates the first fan 102a and the second fan 102b (step S201). By so doing, rotation of the first fan 102a and the rotation of the second fan 102b are started.

Next, the microcomputer 104 applies a predetermined activation voltage to the first lamp 100a and the second lamp 100b via the lamp control section 101 to light up the first lamp 100a and the second lamp 100b (step S202).

Next, the microcomputer 104 activates the video processing section 105 and performs setting of the video processing section 105. By so doing, the video processing section 105 adjusts the quality of an image based on an inputted video signal and performs format conversion of the video signal to an output signal to be outputted to the DMD 106. As a result, light emitted from the first lamp 100a and the second lamp 100b is modulated and reflected by the DMD 106, and the light reflected by the DMD 106 reaches the external screen via the lens 107, whereby video based on the video signal is displayed on the screen (step S203).

Next, the microcomputer 104 measures the rotation speed of the first fan 102a and the rotation speed of the second fan 102b via the fan control section 103 (step S204). It should be noted that when only one of the first lamp 100a and the second lamp 100b is lit up, the microcomputer 104 measures only the rotation speed of the fan corresponding to the currently lit-up lamp.

Next, the microcomputer 104 compares the measured rotation speed measured for each of the first fan 102a and the second fan 102b in step S204 to a preset target rotation speed (a rotation speed that allows the corresponding lamp 100a or 100b to be appropriately cooled), and determines whether the measured rotation speed has reached the target rotation speed. When the measured rotation speed has reached the target rotation speed, the microcomputer 104 returns to step S204 (step S205).

The microcomputer 104 sets, as a target, a fan (the first fan 102a or the second fan 102b) of which the measured rotation speed is determined in step S205 as being less than the target rotation speed, and determines whether a setting voltage that is currently set (a setting voltage for the first fan 102a or the second fan 102b) has reached a maximum voltage that is settable for the target fan (maximum voltage (e.g., rated voltage)>activation voltage). When the setting voltage has reached the settable maximum voltage, the microcomputer 104 proceeds to step S208 (step S206).

On the other hand, the microcomputer 104 sets, as a target, a fan (the first fan 102a or the second fan 102b) for which the setting voltage is determined in step S206 as being less than the settable maximum voltage, instructs the fan control section 103 to increase the fan voltage in order to increase the rotation speed of the target fan, and returns to step S204 (step S207). As a result of step S207, the fan voltage applied to the target fan is increased, and the rotation speed of the target fan is increased.

The microcomputer 104 sets, as a target, a fan (the first fan 102a or the second fan 102b) for which the setting voltage is determined in step S206 as having reached the settable maximum voltage, and determines whether the measured rotation speed (the rotation speed measured in step S204) of the target fan is equal to or less than 70% of the target rotation speed. When the measured rotation speed is not equal to or less than 70% of the target rotation speed, the microcomputer 104 determines that it is possible to cool the corresponding lamp (the first lamp 100a or the second lamp 100b) by the target fan, and returns to step S204 (step S208).

On the other hand, when the measured rotation speed of the target fan (the first fan 102a or the second fan 102b) is equal to or less than 70% of the target rotation speed, the microcomputer 104 determines that the effect of cooling the corresponding lamp is insufficient (i.e., determines that the target fan is abnormal), and proceeds to step S209. Then, the microcomputer 104 turns off, via the lamp control section 101, the lamp (the first lamp 100a or the second lamp 100b) corresponding to the fan (the first fan 102a or the second fan 102b) that is determined in step S208 as being abnormal (step S209).

Subsequently, the microcomputer 104 determines whether at least either one of the first lamp 100a or the second lamp 100b is lit up (step S210). When the microcomputer 104 determines that at least either one of the first lamp 100a or the second lamp 100b is lit up, the microcomputer 104 returns to step S204 and continues the video output.

On the other hand, when the microcomputer 104 determines that both the first lamp 100a and the second lamp 100b are turned off (when there is no lit-up lamp), the microcomputer 104 proceeds to step S211, halts the video processing section 105, and stops the video output. Furthermore, the microcomputer 104 proceeds to step S212 and halts the first fan 102a and the second fan 102b.

[3. Advantageous Effects etc.]

In the present embodiment, when a malfunction in part of a plurality of the fans 102a and 102b is detected by the microcomputer 104 while the lamps 100a and 100b are lit up, the lamp control section 101 turns off part of the lamps corresponding to the part fan and continues to light up the remainder of the lamps.

Here, in a conventional art, when the fan is broken down, the projector is automatically turned off in order to prevent breakage of the lamp or the apparatus which is caused by increase in the temperature of the lamp. In the conventional method, in an important situation such as during showing video to audience or during a presentation, when part of fans is broken down, output of the video is suddenly stopped.

In contrast, according to the present embodiment, even when the fan for part of the lamps is broken down, it is possible to continue to project video. Then, at timing at which the projection of the video is permitted to be stopped, the power is turned off, and it is made possible to conduct a maintenance operation for the fan. In addition, the lamp corresponding to the fan that becomes abnormal is turned off.

Thus, the apparatus is not broken due to increase in the temperatures of the lamp and its surrounding, and it is possible to project video with high reliability for a long period of time. In other words, according to the present embodiment, even when sufficient cooling performance cannot be maintained due to a reason such as deterioration of the first fan 102a or the second fan 102b over time, the lamp cooled by the fan determined as being abnormal is turned off, whereby it is possible to continue to lighting up of the remainder of the lamps and operate the corresponding fan while increase in the temperature within the apparatus is prevented. Accordingly, it is possible to continue to project video.

(Modification 1)

Figure 3:
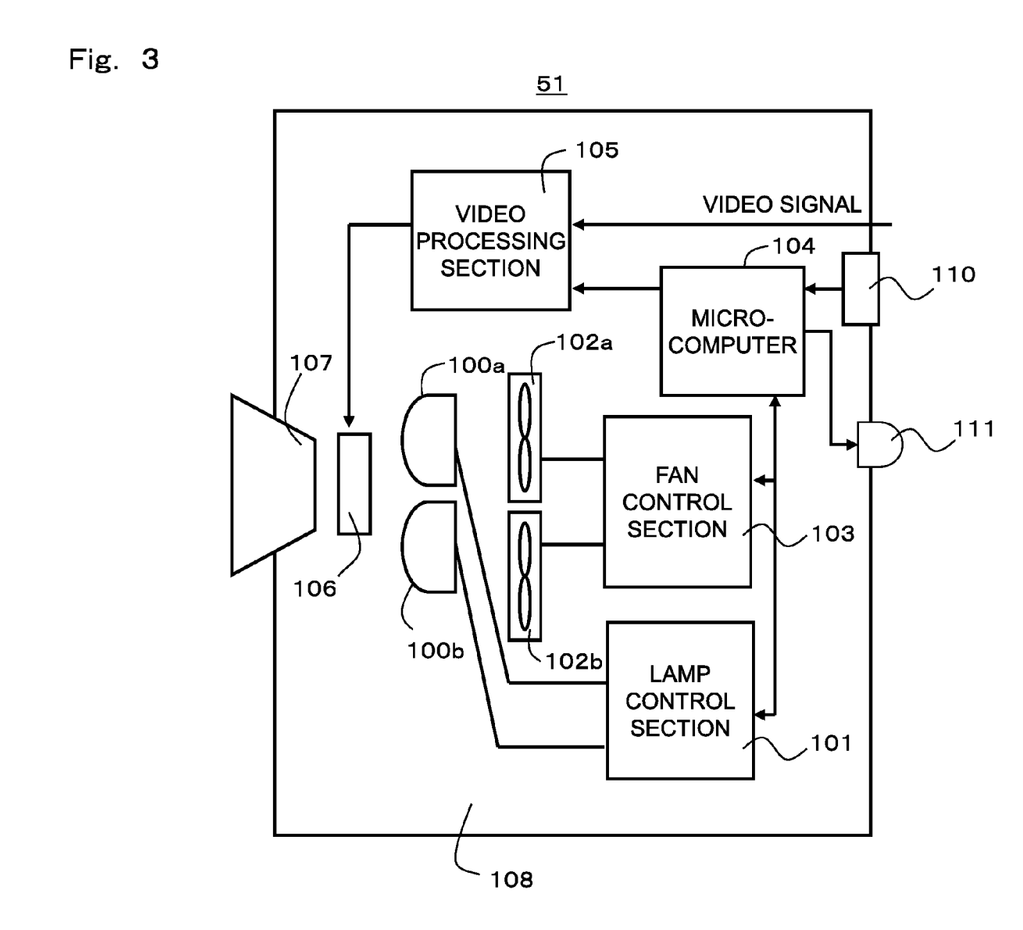
FIG. 3 is a schematic configuration diagram of a projector according to Modification 1 of the embodiment.

Modification 1 of the embodiment will be described. FIG. 3 is a schematic configuration diagram of a projector 51 according to the present modification.

In addition to the configuration of the projector 50 according to the above embodiment, the projector 51 includes: an in-take air temperature sensor 110 that measures the temperature of air drawn in by the first fan 102a and the second fan 102b; and a notification section 111 for notifying the user of a malfunction and/or the like of the first fan 102a and the second fan 102b. In addition, the present modification is different from the above embodiment in that the rotation speed of each of the fans 102a and 102b is controlled on the basis of the temperature of the in-take air. Furthermore, when either the first fan 102a or the second fan 102b is determined as being abnormal, the user is notified of the malfunction by using the notification section 111. The notification section 111 is composed of, for example, an LED. It should be noted that similarly to the above embodiment, a DC fan is used as each of the fans 102a and 102b. This point is also the same in Modifications 2 and 3 described later.

It should be noted that the housing 108 has an air passage through which air flows with rotation of the first fan 102a and the second fan 102b. The housing 108 has an inlet as an entrance of the air passage and has an outlet as an exit of the air passage. A filter is mounted at the inlet. In the air passage, the in-take air temperature sensor 110 is arranged on the upstream side of the first fan 102a and the second fan 102b.

[Operation of Projector]

Figure 4:
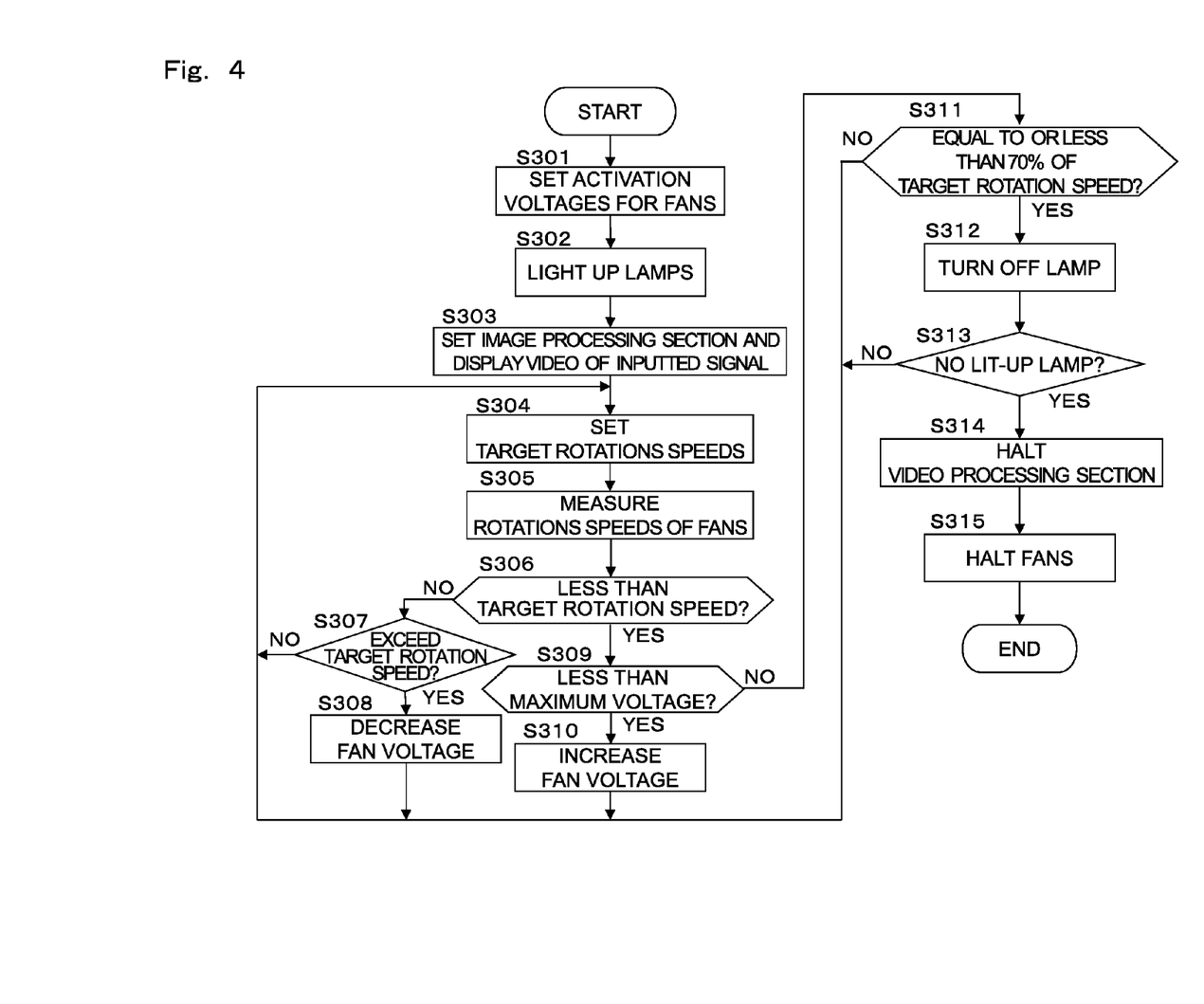
FIG. 4 is a flowchart showing an operation of the projector according to Modification 1 of the embodiment.

FIG. 4 is a flowchart showing an operation of the projector 51 according to the present modification. Hereinafter, the operation of the projector 51 according to the present modification will be described with reference to the flowchart shown in FIG. 4.

When the projector 51 is turned on, the microcomputer 104 starts executing the program loaded from the built-in memory. Then, the microcomputer 104 performs processes in steps S301 to S303, as processes corresponding to the processes in steps S201 to S203 in FIG. 2. In each of steps S301 to S303, the same process as in the corresponding step in FIG. 2 is performed.

In step S304, the microcomputer 104 sets a target rotation speed for each of the first fan 102a and the second fan 102b. Determination data (e.g., a control table) for determining the target rotation speeds for the fans 102a and 102b is previously stored in the built-in memory of the microcomputer 104.

Here, when the temperatures of the currently lit-up lamps 100a and 100b are excessively high, a problem such as damage to the housing 108 may arise due to the heat of the lamps 100a and 100b as described above. On the other hand, when the temperatures of the currently lit-up lamps 100a and 100b are excessively low, the lifetimes of the lamps 100a and 100b may be shortened. Therefore, it is desirable to use the lamps 100a and 100b in an appropriate temperature range (e.g., about 680° C.). In the determination data, in order that the temperatures of the lamps 100a and 100b become appropriate with respect to the temperature of the air drawn into the housing 108, a plurality of values for each target rotation speed are associated with a plurality of values for the in-take air temperature. The determination data is previously created by using, for example, experimental data.

In step S304, the microcomputer 104 acquires a measured value of the in-take air temperature from the in-take air temperature sensor 110, reads, from the determination data, a value for the target rotation speed corresponding to the measured value, and sets the read value as the target rotation speed for the first fan 102a. Similarly, the microcomputer 104 sets a value read from the determination data, as the target rotation speed for the second fan 102b. It should be noted that in the present modification, since the two lamps 100a and 100b are the same and the two fans 102a and 102b are also the same, the same determination data is used for the two fans 102a and 102b. However, when lamps or fans different from each other are used, determination data prepared for each fan may be used.

Next, the microcomputer 104 measures the rotation speed of each of the fans 102a and 102b similarly to step S204 (step S305), and determines whether the measured rotation speed measured for each of the fans 102a and 102b in step S305 is less than the target rotation speed, similarly to step S205 (step S306). Then, for any fan of which the measured rotation speed is determined in step S306 as being less than the target rotation speed, the microcomputer 104 performs processes in step S309 and the subsequent steps as processes corresponding to the processes in step S206 and the subsequent steps in FIG. 2. In each of steps S309 to S315, the same process as in the corresponding step in FIG. 2 is performed. It should be noted that in step S312, in addition to the same process as in step S209 (lamp turning-off), a display for giving a notification of the malfunction is performed by using the notification section 111.

On the other hand, for any fan of which the measured rotation speed is determined in step S306 as being not less than the target rotation speed, the microcomputer 104 proceeds to step S307. Then, the microcomputer 104 determines whether the measured rotation speed measured in step S305 exceeds the target rotation speed (step S307). For any fan of which the measured rotation speed is determined as not exceeding the target rotation speed, the microcomputer 104 returns to step S304. On the other hand, for any fan of which the measured rotation speed is determined as exceeding the target rotation speed, the microcomputer 104 instructs the fan control section 103 to decrease the fan voltage in order to decrease the rotation speed of this fan, and returns to step S304 (step S308).

[Advantageous Effects etc.]

In Modification 1, the in-take air temperature sensor 110, which detects the temperature of the air drawn into the projector 51 by a plurality of the fans 102a and 102b, is provided, and the fan control section 103 controls the rotation speed of each of a plurality of the fans 102a and 102b on the basis of the in-take air temperature detected by the in-take air temperature sensor 110. Then, when the rotation speed of any of the fans 102a and 102b does not agree with the target rotation speed, the fan voltage is increased or decreased, whereby the rotation speeds of the fans 102a and 102b are made appropriate. Thus, it is possible to keep the lamps 100a and 100b at an appropriate temperature and hence it is possible to extend the lifetimes of the lamps 100a and 100b.

(Modification 2)

Modification 2 of the embodiment will be described. A projector according to the present modification includes the components shown in FIG. 3. The present modification is different from the above embodiment in that a notification is given to the user prior to determination that each of the lamps 100a and 100b is abnormal.

[Operation of Projector]

Figure 5:
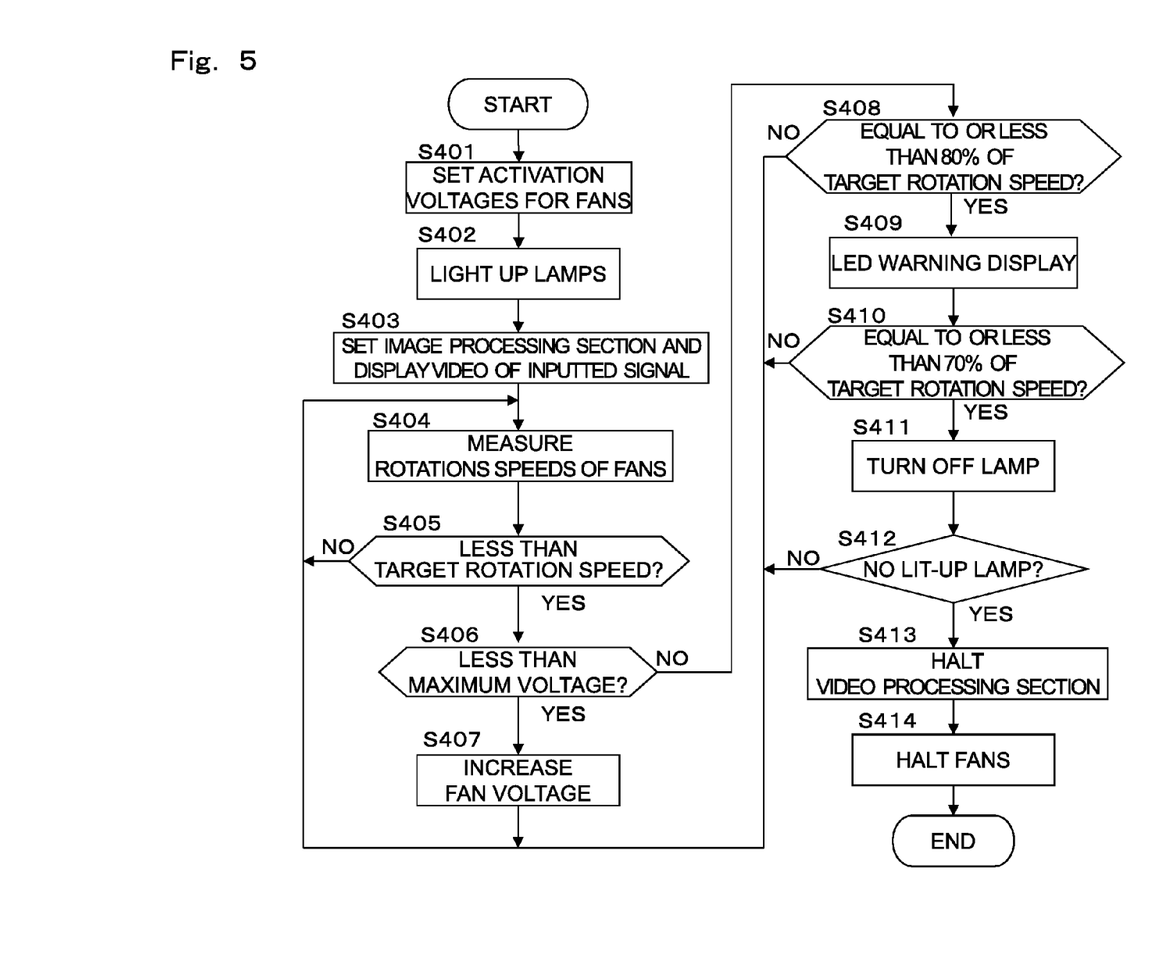
FIG. 5 is a flowchart showing an operation of a projector according to Modification 2 of the embodiment.

FIG. 5 is a flowchart showing an operation of the projector according to the present modification. Hereinafter, the operation of the projector according to the present modification will be described with reference to the flowchart shown in FIG. 5.

When the projector is turned on, the microcomputer 104 starts executing the program loaded from the built-in memory. Then, as processes corresponding to the processes in steps S201 to S207 in FIG. 2, the microcomputer 104 performs processes in steps S401 to S407. In each of steps S401 to S407, the same process as in the corresponding step in FIG. 2 is performed.

In step S408, the microcomputer 104 sets, as a target, any fan for which the setting voltage is determined in step S406 as being not less than the settable maximum voltage, and determines whether the measured rotation speed (the rotation speed measured in step S404) of the target fan is equal to or less than 80% of the target rotation speed. When the measured rotation speed is not equal to or less than 80% of the target rotation speed, the microcomputer 104 determines that a warning about the target fan to the user is unnecessary, and returns to step S404.

It should be noted that in step S408, 80% of the target rotation speed is a threshold for the determination, but the threshold is not limited thereto. The threshold is a value for determining whether the fans 102a and 102b have reached a warning state for which a warning is to be given to the user, prior to determination that each fan is abnormal, and a value greater than a threshold for determining the malfunction (a threshold in step S410) may be used.

The microcomputer 104 sets, as a target, any fan of which the measured rotation speed is determined in step S408 as being equal to or less than 80% of the target rotation speed, and causes the notification section 111 to perform a warning display, in order to notify the user that the rotation speed of the target fan has been decreased (i.e., the lamp cooling capability of the target fan has been diminished) (step S409). The notification section 111 performs a display in a manner different from that when the fan malfunction is notified (step S411 described later).

Subsequently to step S409, the microcomputer 104 performs processes in step S410 and the subsequent steps as processes corresponding to the processes in step S208 and the subsequent steps in FIG. 2. In each of steps S410 to S414, the same process as in the corresponding step in FIG. 2 is performed. It should be noted that in step S411, in addition to the same process as in step S209 (lamp turning-off), a display for giving a notification of the malfunction is performed by using the notification section 111.

[Advantageous Effects etc.]

In the present modification, the notification section 111 for notifying the user of the states of the fans 102a and 102b is provided, and the microcomputer 104 determines whether each of the fans 102a and 102b has reached a warning state for which a warning is to be given to the user (a state where the measured rotation speed is equal to or less than 80% of the target rotation speed), prior to determination that each fan is abnormal. Then, when a fan that is in the warning state is detected by the microcomputer 104, a notification to the user is performed by using the notification section 111. Thus, before any of the fans reaches an abnormal state, the user is allowed to take measures such as repair for the fans. Therefore, it is possible to avoid a situation where any of the lamps is suddenly turned off during use of the projector 51.

(Modification 3)

Modification 3 of the embodiment will be described. A projector according to the present modification includes the components shown in FIG. 3. The present modification is different from the above embodiment in that the brightness of each of the lamps 100a and 100b is adjustable by the lamp control section 101.

In the present modification, each of the lamps 100a and 100b is switchable between a first setting (LOW) and a second setting (HIGH) brighter than the first setting. It should be noted that the brightness of each of the lamps 100a and 100b may be adjustable at three or more levels or may be continuously adjustable.

In addition, in the present modification, as the determination data for determining the target rotation speed for each of the fans 102a and 102b, first data used when the lamps 100a and 100b are set at the first setting and second data used when the lamps 100a and 100b are set at the second setting are previously stored in the built-in memory of the microcomputer 104. When the first data is used, it is possible to determine such a target rotation speed that the temperatures of the lamps 100a and 100b that have been switched to the first setting become appropriate with respect to the temperature of the air drawn into the housing 108. When the second data is used, it is possible to determine such a target rotation speed that the temperatures of the lamps 100a and 100b that have been switched to the second setting become appropriate with respect to the temperature of the air drawn into the housing 108.

[Operation of Projector]

Figure 6:
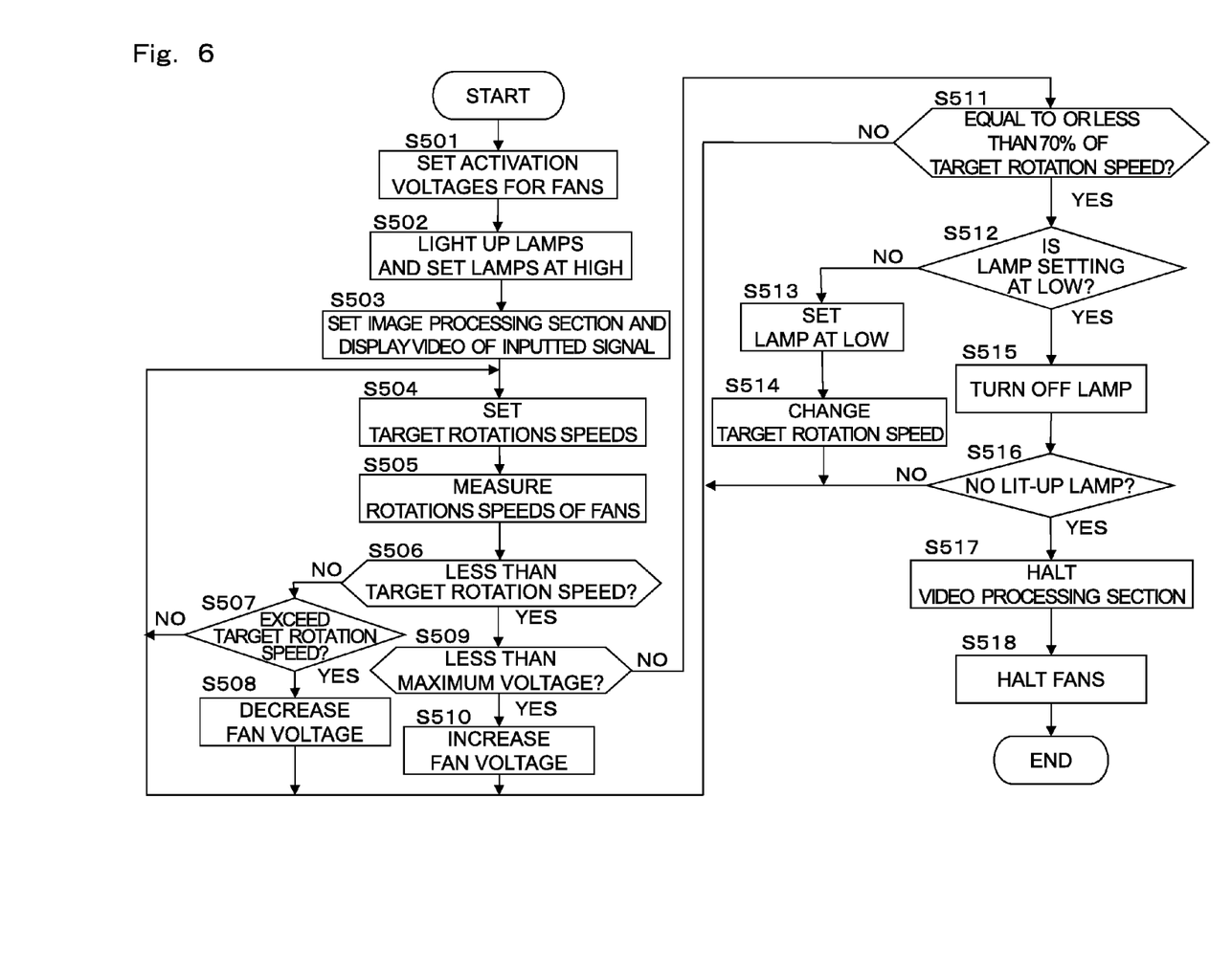
FIG. 6 is a flowchart showing an operation of a projector according to Modification 3 of the embodiment.

FIG. 6 is a flowchart showing an operation of the projector according to the present modification. Hereinafter, the operation of the projector according to the present modification will be described with reference to the flowchart shown in FIG. 6.

When the projector is turned on, the microcomputer 104 starts executing the program loaded from the built-in memory. Then, as processes corresponding to the processes in steps S301 to S311 in FIG. 4, the microcomputer 104 performs processes in steps S501 to S511. In each of steps S501 to S511, the same process as in the corresponding step in FIG. 4 is performed. It should be noted that in step S502, in addition to the same process as in step S302 (lamp lighting-up), each of the lamps 100a and 100b is set at the second setting (HIGH).

In step S512, the microcomputer 104 sets, as a target, the lamp corresponding to any fan of which the measured rotation speed is determined in step S511 as being equal to or less than 70% of the target rotation speed, and determines whether the target lamp is set at the first setting (LOW). In other words, the microcomputer 104 determines whether it is possible to decrease the brightness of the target lamp.

When the target lamp is not set at the first setting in step S512, the microcomputer 104 switches the target lamp to the first setting via the lamp control section 101 (step S513). In addition, the microcomputer 104 sets, as a target, the fan corresponding to the lamp that has been switched to the first setting, and changes the target rotation speed of the target fan (step S514). In step S514, the microcomputer 104 reads, from the first data among the determination data, a value for the target rotation speed corresponding to the measured value from the in-take air temperature sensor 110, and sets the read value as the target rotation speed. Then, the microcomputer 104 controls, via the fan control section 103, the rotation speed of the target fan to the value set as the target rotation speed.

On the other hand, when the target lamp is set at the first setting in step S512 (i.e., when it is impossible to decrease the brightness of the target lamp), the microcomputer 104 performs processes in step S515 and the subsequent steps as processes corresponding to the processes in step S312 and the subsequent steps in FIG. 4. In each of steps S515 to S518, the same process as in the corresponding step in FIG. 4 is performed.

[Advantageous Effects etc.]

In the present modification, the fan control section 103 controls the rotation speeds of the fans 102a and 102b corresponding to the lamps 100a and 100b, in accordance with the brightness of the lamps 100a and 100b. As the brightness of the lamps 100a and 100b is increased, the fan control section 103 increases the rotation speeds of the fans 102a and 102b corresponding to the lamps 100a and 100b. Then, the lamp control section 101 adjusts the brightness of the lamps 100a and 100b corresponding to the fans 102a and 102b, on the basis of a result of the diagnosis of the fans 102a and 102b by the microcomputer 104. Specifically, when a fan that is in a predetermined capability-diminished state (a state where the measured rotation speed is equal to or less than 70% of the target rotation speed) is detected by the microcomputer 104, the lamp control section 101 decreases the brightness of the lamp corresponding to the detected fan.

According to the present modification, with decreasing the brightness of the lamp, the target rotation speed for the fan corresponding to the lamp is decreased. Thus, the fan of which the rotation speed has been equal to or less than 70% of the target rotation speed is not immediately determined as being abnormal, as long as it is possible to decrease the brightness of the corresponding lamp. Therefore, it is possible to extend a time period when the lamp is lit up.

In addition, in the present modification, when a fan that is in the capability-diminished state is detected by the microcomputer 104, if the brightness of the lamp corresponding to the detected fan is at a settable minimum value, the lamp control section 101 turns off the lamp. Thus, it is possible to avoid increase in the temperature of the lamp corresponding to the fan whose cooling capability is insufficient.

It should be noted that in the present modification, the threshold for determining whether to decrease the brightness of the lamp is the same as the threshold for determining whether the fan is abnormal. However, the threshold for determining whether to decrease the brightness of the lamp may be a value (e.g., 80% of the target rotation speed) greater than the threshold for determining whether the fan is abnormal. In this case, it is possible to decrease the rotation speeds of the fans beforehand, and thus it is possible to extend the lifetimes of the fans.

Other Embodiments

As described above, the above embodiment including the modifications has been described as an illustrative example of the technology disclosed in the present application. However, the technology in the present disclosure is not limited thereto, and is also applicable to embodiments in which changes, substitutions, additions, omissions, and/or the like are made as appropriate. In addition, each constituent element described in the above embodiment can be combined to provide a new embodiment.

Other embodiments will be described below.

Although the above embodiment and modifications (hereinafter, referred to as "embodiment and the like") have been described with, as a projection type display apparatus, the projector using the DMD, the technology in the present disclosure is not limited thereto and also applicable to a liquid crystal projector.

In the embodiment and the like, a high-pressure mercury lamp is used as each light source, but solid light sources such as LEDs or another type of light sources may be used.

In the embodiment and the like, the case where the technology in the present disclosure is applied to a dual-lamp type using two lamps has been described. However, the number of lamps may be three or more.

In the embodiment and the like, the DC fan is used as each of the fans 102a and 102b. However, a PWM (pulse width modulation) fan whose rotation speed is controlled by lengthening or shortening an ON period of a fan voltage during a given time period may be used. In this case, in step S206, step S309, step S406, and step S509, instead of determining whether the setting voltage is less than the maximum voltage, the microcomputer 104 determines whether a setting ON ratio that is currently set is less than a settable maximum ON ratio. In addition, in step S207, step S310, step S407, and step S510, instead of instructing the fan control section 103 to increase the fan voltage, the microcomputer 104 instructs the fan control section 103 to increase the ratio of the ON period of the fan voltage. Furthermore, in step S308 and step S508, instead of instructing the fan control section 103 to decrease the fan voltage, the microcomputer 104 instructs the fan control section 103 to decrease the ratio of the ON period of the fan voltage.

In the embodiment and the like, with 70% of the target rotation speed as a threshold, it is determined whether the fans 102a and 102b are abnormal. However, the threshold for the determination is not limited thereto.

In the embodiment and the like, on the basis of the rotation speeds of the fans 102a and 102b, it is determined whether the fans 102a and 102b are abnormal. However, on the basis of other information (e.g., the volume of air from each fan), it may be determined whether the fans 102a and 102b are abnormal.

As presented above, the embodiment has been described as an example of the technology according to the present disclosure. For this purpose, the accompanying drawings and the detailed description are provided.

Therefore, components in the accompanying drawings and the detail descript ion may include not only components essential for solving problems, but also component s that are provided to illustrate the above described technology and are not essential for solving problems. Therefore, such inessential components should not be readily construe d as being essential based on the fact that such inessential components are shown in the accompanying drawings or mentioned in the detailed description.

Further, the above described embodiment has been described to exemplify the technology according to the present disclosure, and therefore, various modifications, replacements, additions, and omissions may be made within the scope of the claims and the scope of the equivalents thereof.

What is claimed is:

1. A projection type display apparatus comprising:
a plurality of light sources;
a light source control section configured to control each of the plurality of light sources;

a plurality of fans, provided to correspond to each of the plurality of light sources, respectively, for cooling the corresponding light sources; and a fan diagnosis section configured to diagnose a state of each of the plurality of fans, wherein when the fan diagnosis section detects a malfunction in part of the plurality of fans while the plurality of light sources are lit up, the fan diagnosis section controls the light source control section to turn off part of the light sources corresponding to the part of the plurality of fans in which the malfunction is detected and continue to light up the remainder of the light sources.

2. The projection type display apparatus according to claim 1, wherein the brightness of each light source is adjustable by the light source control section, the projection type display apparatus further comprises a fan control section configured to control rotation speeds of the fans corresponding to the light sources, in accordance with the brightness of the light sources, and the light source control section adjusts the brightness of the light sources corresponding to the fans, on the basis of a result of the diagnosis of the fans by the fan diagnosis section.

3. The projection type display apparatus according to claim 2, wherein when the fan diagnosis section detects a fan that is in a predetermined capability-diminished state among the plurality of fans, the fan diagnosis section controls the light source control section to decrease the brightness of the light source corresponding to the detected fan.

4. The projection type display apparatus according to claim 3, wherein when the fan diagnosis section detects the fan that is in the capability-diminished state among the plurality of fans, if the brightness of the light source corresponding to the detected fan is at a settable minimum value, the fan diagnosis section controls the light source control section to turn off the light source.

5. The projection type display apparatus according to claim 1, further comprising a notification section configured to notify a user of the states of the fans, wherein at a stage prior to determination that the malfunction has occurred in each fan, the fan diagnosis section determines whether each fan has reached a warning state for which a warning is to be given to the user, and when the fan diagnosis section detects a fan that is in the warning state among the plurality of fans, the fan diagnosis section performs a notification to the user by using the notification section.

6. The projection type display apparatus according to claim 1, wherein the fan diagnosis section detects the malfunction in each fan on the basis of the rotation speed of each fan.

7. The projection type display apparatus according to claim 1, further comprising:

a temperature detection section configured to detect a temperature of air drawn into the projection type display apparatus by the plurality of fans; and a fan control section configured to control a rotation speed of each of the plurality of fans on the basis of the temperature of the in-take air detected by the temperature detection section.

8. The projection type display apparatus according to claim 1, wherein each light source is a high-pressure mercury lamp.

9. The projection type display apparatus according to claim 1, wherein each light source is a solid light source.

10. A non-transitory computer-readable recording medium having a computer program recorded thereon, the computer program being used for controlling a projection type display apparatus that includes a plurality of light sources and a plurality of fans, provided to correspond to the plurality of light sources, respectively, for cooling the corresponding light sources, the computer program causing a computer to operate as:

a light source control section configured to control each of the plurality of light sources; and a fan diagnosis section configured to diagnose a state of each of the plurality of fans, wherein when the fan diagnosis section detects a malfunction in part of the plurality of fans while the plurality of light sources are lit up, the fan diagnosis section controls the light source control section to turn off part of the light sources corresponding to the part of the plurality of fans in which the malfunction is detected and continue to light up the remainder of the light sources.

11. The projection type display apparatus according to claim 1, further including a fan control section configured to control a rotation speed of each of the plurality of fans on the basis of a setting voltage of the fan, wherein the fan diagnosis section detects, as a malfunctioning fan, a fan whose setting voltage has reached a settable maximum value and whose measured rotation speed is equal to or less than a predetermined threshold, among the plurality of fans.

12. The projection type display apparatus according to claim 11, wherein when the setting voltage of a fan whose measured rotation speed has been determined to be equal to or less than the predetermined threshold among the plurality of fans is less than the maximum value, the fan diagnosis section increases the setting voltage via the fan control section, and when the setting voltage of the fan whose measured rotation speed has been determined to be equal to or less than the predetermined threshold has reached the maximum value, the fan diagnosis section detects the fan as a malfunctioning fan.

13. The projection type display apparatus according to claim 1, further including a fan control section configured to control a rotation speed of each of the plurality of fans on the basis of a ratio of a fan voltage ON period to a predetermined period, wherein the fan diagnosis section detects, as a malfunctioning fan, a fan whose setting ratio of the fan voltage ON period has reached a settable maximum ratio and whose measured rotation speed is equal to or less than a predetermined threshold, among the plurality of fans.

14. The projection type display apparatus according to claim 12, wherein when the setting ratio of the fan voltage ON period of a fan whose measured rotation speed has been determined to be equal to or less than the predetermined threshold among the plurality of fans is less than the maximum ratio, the fan diagnosis section increases the ratio of the fan voltage ON period via the fan control section, and when the setting ratio of the fan voltage ON period of the fan whose measured rotation speed has been determined to be equal to or less than the predetermined threshold has reached the maximum ratio, the fan diagnosis section detects the fan as a malfunctioning fan.

15. The projection type display apparatus according to claim 3, wherein when the brightness of a light source corresponding to a fan whose measured rotation speed has been determined to be equal to or less than a predetermined threshold is set at a minimum value, the fan diagnosis section controls the light source control section to turn off the light source corresponding to the fan whose measured rotation speed has been determined to be equal to or less than a predetermined threshold, and continue to light up the remainder of the light sources.

16. The projection type display apparatus according to claim 1, further including a video processing section configured to process a video signal from a predetermined output source while the plurality of light sources are lit up, wherein
after the fan diagnosis section has detected the malfunction in part of the plurality of fans, the video processing section continues to process the video signal from the same output source as before the detection of the malfunction, whereby the projection type display apparatus continues to display video based on the video signal.

* * * * *